United States Patent

[11] 3,602,368

| [72] | Inventor | Robert H. Gould<br>Clifton Heights, Pa. |
|---|---|---|
| [21] | Appl. No. | 859,268 |
| [22] | Filed | Sept. 19, 1969 |
| [45] | Patented | Aug. 31, 1971 |
| [73] | Assignee | Sun Oil Company<br>Philadelphia, Pa. |

[54] PALLET FOR GAS CYLINDERS AND THE LIKE
12 Claims, 4 Drawing Figs.

[52] U.S. Cl. .................................................. 206/65 R,
108/55, 211/71
[51] Int. Cl. ......................................................... B65d 19/10
[50] Field of Search ........................................... 206/65;
108/55, 51; 214/621; 211/71

[56] References Cited
UNITED STATES PATENTS

| 3,289,613 | 12/1966 | Evans .......................... | 108/55 X |
| 3,229,836 | 1/1966 | Koenig ......................... | 214/621 X |
| 2,906,405 | 9/1959 | Erickson ....................... | 214/621 X |
| 2,828,933 | 4/1958 | DePew et al. .................. | 108/55 |

Primary Examiner—Leonard Summer
Attorneys—George L. Church, Donald R. Johnson, Wilmer E. McCorquodale, Jr. and Frank A. Rechif ABSTRACT: A pallet suitable for supporting and transporting gas cylinders or like articles includes a baseplate (for supporting the articles) and, on top of this baseplate, a pair of tunnels for receiving the tines of a forklift truck plus a pair of upstanding frameworks at respective opposite sides of the plate, for stabilizing the upper ends of the elongated articles.

PATENTED AUG 31 1971 3,602,368

INVENTOR:
ROBERT H. GOULD
BY Donald R. Johnson
ATTY.

PATENTED AUG 31 1971 3,602,368

INVENTOR:
ROBERT H. GOULD
BY Donald R. Johnson
ATTY

3,602,368

PALLET FOR GAS CYLINDERS AND THE LIKE

This invention relates to a pallet for supporting and transporting vertically elongated articles, such as cylinders of compressed gas, in their upright position. The pallet of the invention is particularly suitable for transporting "Size 1A" gas cylinders, although it can be used for transporting other vertically elongated articles.

In the past, conventional handtrucks, handcarts, dollies, or the like, have often been used for transporting gas cylinders. However, in order to load the cylinders on material handling apparatus of this nature, the cylinders must be laid down, or at least tilted; this procedure always carries with it the hazard of dropping the cylinders, which is definitely not to be desired.

Conventional pallets (used in conjunction with forklift trucks) have a height of several inches. When such pallets are used for transporting gas cylinders, the cylinders must either be manually lifted onto the pallet or rolled up or down a ramp. Since the cylinders weigh approximately 150 pounds each, lifting is quite burdensome, and the rolling of the cylinders up or down a ramp involves the hazard of the cylinders slipping, with possible consequent damage to the cylinder and/or injury to the person or persons handling the cylinders.

An object of this invention is to provide a novel pallet.

Another object is to provide a device for transporting vertically elongated articles which is much safer to use than are devices of the prior art.

A further object is to provide a device for transporting gas cylinders which eliminates the hazards associated with prior devices.

Still another object is to provide a device for transporting gas cylinders which eliminates manual lifting of the cylinders, rolling the cylinders up or down a ramp, laying the cylinders down, and tilting of the cylinders.

The objects of this invention are accomplished, briefly, in the following manner:

A pallet is provided which comprises a baseplate on the upper surface of which are secured, at the respective side edges thereof, two parallel tunnels spaced to receive the tines of a forklift truck. Atop each of these tunnels is secured a side framework which stabilizes the upper ends of gas cylinders or like articles supported by the baseplate between the two tunnels. Horizontal retaining members, extending between the upper ends of the two frameworks, are provided to restrict movement of the upper ends of the cylinders in a direction parallel to the lengths of the tunnels.

A detailed description of the invention follows, taken in conjunction with the accompanying drawings, wherein.

Figure 1:
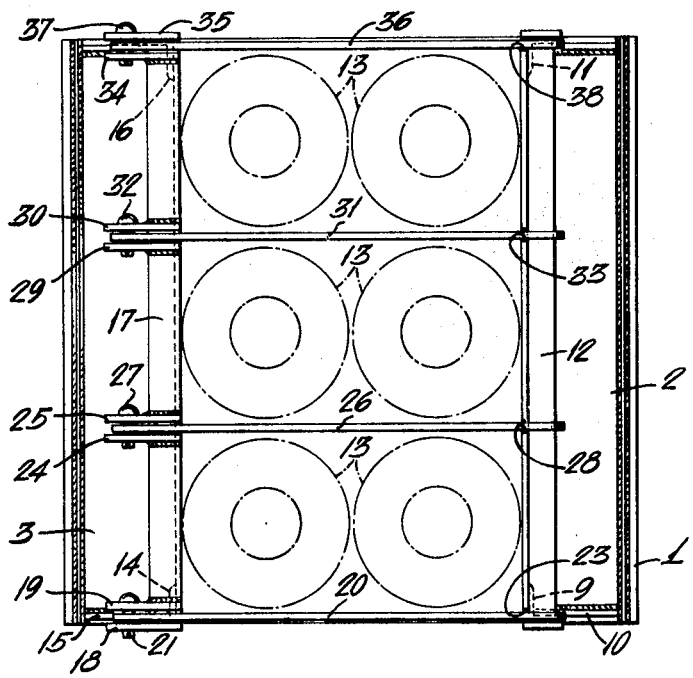
FIG. 1 is a plan or top view of a pallet according to the invention, showing in outline form a plurality of gas cylinders resting thereon.

Now referring to the drawings, the pallet of this invention is founded upon a rigid baseplate 1, which is approximately square in configuration and ⅜inch thick, or of a thickness deemed sufficient for the weight of the objects to be handled. The baseplate has sufficient strength and rigidity to support the articles 13 being transported. Two parallel, spaced inverted channel-shaped members 2 and 3 are welded to the upper face of plate 1, each of these latter members being adjacent a respective one of the side edges of plate 1 (see FIG. 2). The members 2 and 3 may be ⅜inch thick, or of a thickness to match plate 1. The members 2 and 3, together with the portions of plate 1 therebeneath, form parallel open-ended tunnels which extend along the full length of baseplate 1, and are adapted to receive the respective tines or load engaging projections 4 and 5 of an industrial forklift truck 6 (see FIG. 4) of conventional type. The industrial truck 6 embodies a source of power (not shown) adapted to selectively elevate and lower the forwardly projecting load engaging projections or tines 4 and 5 (by means of suitable mechanism in the vertical guides 7), or establish a drive to the supporting wheels such as 8 for moving the truck for material transferring purposes. The truck 6, with its fork 4, 5, guides 7, etc. is commonly available, and no claim to patent protection thereon is sought herein.

A vertically extending structural steel angle 9 is welded at its lower end to the top of member 2, closely adjacent one end of the latter, a triangular gusset plate 10 being welded !to angle 9 and member 2 for strengthening purposes. A similar vertically extending structural steel angle 11 is welded at its lower end to the top of member 2, closely adjacent the other end of the latter, a gusset plate preferably being used also at this latter junction. The upper ends of angles 9 and 11 are connected by a horizontally extending structural steel angle 12 welded at its opposite ends to the upper ends of angles 9 and 11, respectively. Members 9, 11, and 12 together form a framework at one side of the baseplate, for restricting the lateral movement of the upper ends of the vertically elongated articles 13 (e.g. compressed gas cylinders) which are supported on the baseplate 1.

A vertically extending structural steel angle 14 is welded at its lower end to the top of member 3, closely adjacent one end of the latter, a triangular gusset plate 15 being welded to angle 14 and member 3 for strengthening purposes. A similar vertically extending structural steel angle 16 is welded at its lower end to the top of member 3, closely adjacent the other end of the latter, a gusset plate preferably being used also at this latter junction. The upper ends of angles 14 and 16 are connected by a horizontally extending structural steel angle 17 (inverted with respect to angle 12) welded at its opposite ends to the upper ends of angles 14 and 16, respectively. The members 14, 16, and 17 together form a framework at the other side of baseplate 1 (opposite to framework 9, 11, 12), for restricting the lateral movement of the upper ends of articles 13.

A plate 18, somewhat resembling an inverted L in shape and extending outwardly and upwardly from the upper end of angle 14 and from the adjacent end of angle 17, is welded to the outer surface of angle 14 at the upper end thereof and to one end (angular) face of angle 17. An outwardly extending ear 19, formed from steelplate, is welded to the upper surface of angle 17, in spaced, parallel relation to plate 18. One end of a steel bar 20 is mounted, for pivotal movement in a substantially vertical plane, between plate 18 and ear 19, by means of a pivot pin 21 which extends horizontally through aligned apertures in ear 19, bar 20, and plate 18. Bar 20 is adapted to swing through an arc 22 (FIG. 2), between a substantially horizontal (active) position (shown in solid lines) and a substantially vertical (inactive) position (shown in dot-dash lines). Angle 12, at the side of the pallet opposite to angle 17, has therein a vertical notch 23 aligned with bar 20, to receive the free end of this bar when it is swung down to its horizontal (active) position, wherein it extends across the pallet.

Two outwardly extending ears 24 and 25, formed from steelplate, are welded to the upper surface of angle 17, in spaced, parallel relation to each other. Ears 24 and 25 are located intermediate the ends of angle 17, at a distance from ear 19 which is just slightly in excess of the maximum external diameter of the gas cylinders 13 to be carried on the pallet. As illustrated in FIG. 1, the distance across the pallet between the angles 12 and 17 (or between the members 2 and 3) is such as to accommodate two the the elongated articles (gas cylinders) 13 arranged side-by-side. One end of a steel bar 26 is mounted, for pivotal movement in a substantially vertical plane, between ears 24 and 25, by means of a pivot pin 27 which extends horizontally through aligned apertures in ears 24 and 25 and bar 26. Bar 26, like bar 20, is adapted to swing through an arc between a substantially horizontal (active) position and a substantially vertical *(inactive) position.

Angle 12 has therein a vertical notch 28 aligned with bar 26, to receive the free end of this bar when it is swung to its horizontal (active) position, wherein it extends across the pallet.

Two outwardly extending ears 29 and 30, formed from steelplate, are welded to the upper surface of angle 17, in spaced, parallel relation to each other. Ears 29 and 30 are located intermediate the ends of angle 17, on the opposite side of ear 25 from ear 19 and at a distance from ear 25 which is just slightly in excess of the maximum external diameter of the gas cylinders 13 for which the pallet is designed. In this connection, it may be noted here that the bottom ends of all of the cylinders 13 rest on and are carried by baseplate 1. One end of a steel bar 31 is mounted, for pivotal movement in a substantially vertical plane, between ears 29 and 30, by means of a pivot pin 32 which extends horizontally through aligned apertures in ears 29 and 30 and bar 31. Bar 31, like bars 20 and 26, is adapted to swing through an arc between a substantially horizontal (active) position and a substantially vertical *(inactive) position. Angle 12 has therein a vertical notch 33 aligned with bar 31, to receive the free end of this bar when it is swung to its horizontal (active) position, wherein it extends across the pallet.

An outwardly extending ear 34, formed from steelplate, is welded to the upper surface of angle 17, at a location adjacent the end of this angle, on the opposite side of ear 30 from ear 25 and at a distance from ear 30 which is just slightly in excess of the maximum external diameter of the vertically elongated articles 13 for which the pallet is designed. A plate 35, similar in shape to plate 18 previously described, is welded to the outer surface of angle 16 at the upper end thereof and to the end (angular) face of angle 17 opposite to plate 18, in spaced, parallel relation to ear 34. One end of a steel bar 36 is mounted, for pivotal movement in a substantially vertical plane, between plate 35 and ear 34, by means of a pivot pin 37 which extends horizontally through aligned apertures in ear 34, bar 36, and plate 35. Bar 36, like bars 31, 26, and 20, is adapted to swing through an arc between a substantially horizontal (active) position and a substantially vertical (inactive) position. Angle 12 has therein a vertical notch 38 aligned with bar 36, to receive the free end of this bar when it is swung to its horizontal (active) position, wherein it extends across the pallet.

The weights of each of the bars 20, 26, 31, and 36 are sufficient to eliminate the possibility of their jumping out of place (referring to their horizontal positions, extending across the pallet, between angles 17 and 12) during transport of the pallet.

Figure 2:
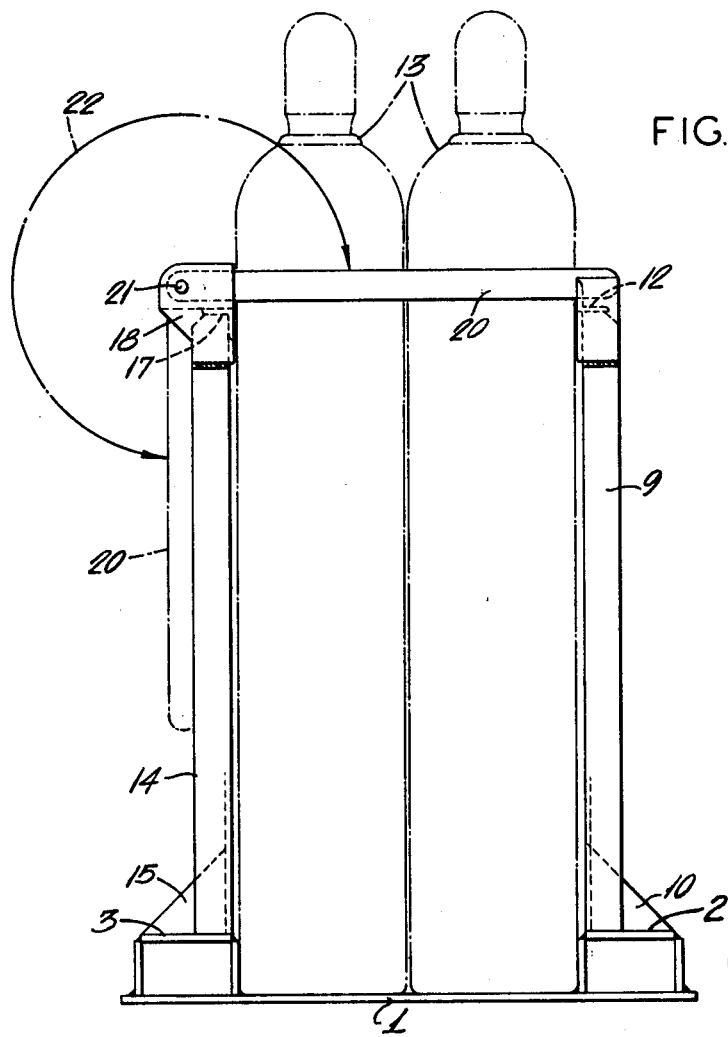
FIG. 2 is a front elevation of the pallet of FIG. 1.
Figure 3:
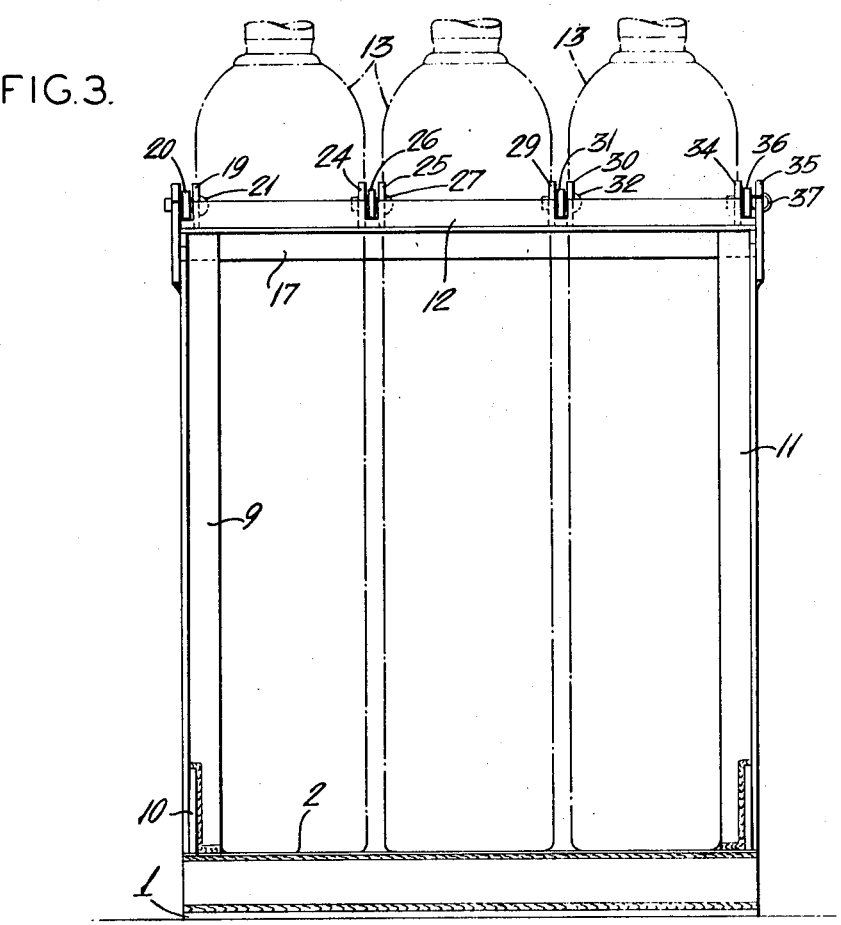
FIG. 3 is a side elevation of the pallet of FIG. 1.

It may be pointed out that the pallet of this invention is adapted for transportation of from one to six gas cylinders 13. As illustrated in FIG. 2, all of the bars such as 20 are arranged so that in their horizontal or active positions they will be located in the region of the upper ends of the cylinders 13. The bars may be swung across the pallet and between adjacent pairs of cylinders. The bars when in their active positions serve to restrain movement of the cylinders 13 in a direction parallel to the lengths of the tunnels 2 and 3, while the side frameworks (and particularly the horizontal angles 17 and 12, which are also located in the region of the upper ends of the cylinders; see FIG. 2) serve to restrain movement of the cylinders 13 in a direction perpendicular to the lengths of the tunnels. Bars 20, 26, 31, and 36, when not being used, and thus when not in their horizontal, active positions between the gas cylinders, may be swung to vertical, out of the way positions such as illustrated in dot-dash lines in FIG. 2. In the vertical positions, the bars hang downwardly from their respective pivot pins, outside of the space between the tunnels 2 and 3.

Figure 4:
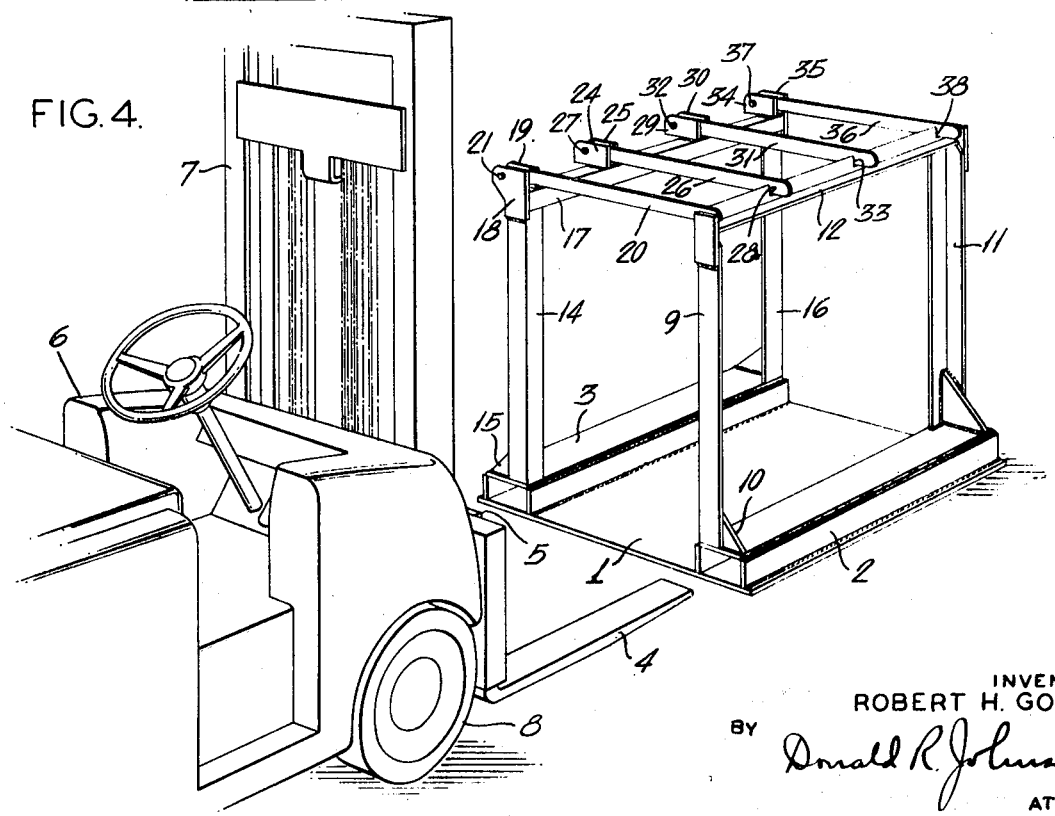
FIG. 4 is an isometric view illustrating an unloaded or empty pallet of the invention and a material handling and transporting instrumentality (forklift truck) showing a method of utilizing the latter with my invention.

Refer now to FIG. 4. As previously stated, the tunnels formed by members 2 and 3 are spaced a proper distance to receive the respective load elevating projections (tines) 4 and 5 carries by the forklift truck 6. When the projections 4 and 5 have been entered into the tunnels 2 and 3 by forward movement a sufficient distance to adequately support the pallet with its load, the mechanism of the truck 6 is operated in a manner to move the tines 4 and 5 upwardly whereby these tines engage the upper walls of the tunnels to lift the entire pallet and the load carried thereby (i.e., supported on baseplate 1).

It will be noted that the tunnels 2 and 3 are located atop the baseplate 1 which supports the articles 13. This "underslung" feature eliminates the necessity of manually lifting the gas cylinders when loading and unloading the pallet, or of rolling them up or down a ramp. The baseplate 1, upon which the cylinders rest, is only ⅜inch thick, so the cylinders can be easily moved on and off the pallet by a rotating motion directed by hand to the top of each cylinder.

As previously described, a forklift truck 6 is utilized in the actual transporting of the pallet bearing the cylinders. The cylinders always remain in the normal upright (operating) position, thus eliminating the potential hazard of a dropped cylinder which could occur when laying them down or tilting them for placing on conventional hand carts, dollies, etc.

The invention claimed is:

1. A pallet for supporting and transporting vertically elongated articles in their upright position, comprising a rigid baseplate for supporting said articles, means, attached to the upper face of said baseplate, providing a pair of parallel tunnels which extend along opposite side edges of said upper face and which are spaced to receive the tines of a forklift truck, said articles being accommodated by said baseplate in the space between said tunnels; means secured to the top of one of said tunnels providing a framework at one side of said baseplate for restricting the lateral movement of the upper ends of said articles; and means secured to the top of the other of said tunnels providing a framework at the other side of said baseplate for restricting the lateral movement of the upper ends of said articles.

2. Structure according to claim 1, wherein the first-mentioned means comprises a pair of inverted channel-shaped members secured to the upper face of said baseplate one at each respective side edge thereof.

3. Structure according to claim 1, wherein each of the second-mentioned and third-mentioned means comprises a pair of upstanding columnar members secured at their lower ends to respective opposite ends of the corresponding tunnel, and a framing member extending substantially parallel to the length of the tunnel and secured at its ends respectively to the upper ends of the corresponding columnar members.

4. Structure according to claim 1, wherein the first-mentioned means comprises a pair of inverted channel-shaped members welded to the upper face of said baseplate one at each respective side edge thereof; and wherein each of the second-mentioned and third-mentioned means comprises a pair of upstanding columnar members secured at their lower ends to respective opposite ends of the corresponding channel-shaped member, and a framing member extending substantially parallel to the length of the channel-shaped member and secured at its ends respectively to the upper ends of the corresponding columnar members.

5. Structure of claim 1, including also a rigid retaining member coupled to both of said frameworks and extending across the space therebetween, thereby to restrict movement of the upper ends of said articles in a direction parallel to the lengths of the tunnels.

6. Structure set forth in claim 5, wherein said retaining member is movable between an operative position wherein it extends across the space between said frameworks an an inoperative position wherein it lies outside of said space.

7. Structure set forth in claim 5, wherein the tunnel providing means comprises a pair of inverted channel-shaped members secured to the upper face of said base plate one at each respective side edge thereof.

8. Structure set forth in claim 5, wherein the tunnel providing means comprises a pair of inverted channel-shaped members welded to the upper face of said baseplate one at each respective side edge thereof; and wherein each of the framework providing means comprises a pair of upstanding columnar members secured at their lower ends to respective opposite ends of the corresponding channel-shaped member, and a framing member extending substantially parallel to the length of the channel-shaped member and secured at its ends respectively to the upper ends of the corresponding columnar members.

9. Structure of claim 1, including also a plurality of spaced, parallel rigid retaining members each coupled to both of said frameworks and extending across the space therebetween, thereby to restrict movement of the upper ends of said articles in a direction parallel to the lengths of the tunnels.

10. Structure set forth in claim 9, wherein each of said retaining members is individually movable between an operative position wherein it extends across the space between said frameworks and an inoperative position wherein it lies outside of said space.

11. A pallet for supporting and transporting vertically elongated articles in their upright position, comprising a rigid baseplate; means, attached to the upper face of said baseplate, providing a pair of parallel tunnel configurations for receiving the tines of a forklift truck; a pair of parallel rigid elongated upright members having their lower ends fixedly mounted with respect to said baseplate, one member at each end of one of said tunnel configurations; a rigid elongated side member secured at its opposite ends respectively to the upper ends of said upright members, said side member extending generally parallel to said tunnel configurations; a pair of parallel rigid elongated upright members having their lower ends fixedly mounted with respect to said baseplate, one member at each end of the other of said tunnel configurations; a rigid elongated side member secured at its opposite ends respectively to the upper ends of said last-mentioned upright members, said last-mentioned side member extending generally parallel to said tunnel configurations; and a rigid retaining member coupled to both of said side members and extending across the space therebetween, said retaining member being movable between an operative position wherein it extends across the space between said side members and an inoperative position wherein it lies outside of said space.

12. A pallet for supporting and transporting vertically elongated articles in their upright position, comprising a rigid baseplate; means, attached to the upper face of said baseplate, providing a pair of parallel tunnel configurations for receiving the tines of a forklift truck; a pair of parallel rigid elongated upright members having their lower ends fixedly mounted with respect to said baseplate, one member at each end of one of said tunnel configurations; a rigid elongated side member secured at its opposite ends respectively to the upper ends of said upright members, said side member extending generally parallel to said tunnel configurations; a pair of parallel rigid elongated upright members having their lower ends fixedly mounted with respect to said baseplate, one member at each end of the other of said tunnel configurations; a rigid elongated side member welded at its opposite ends respectively to the upper ends of said last-mentioned upright members, said last-mentioned side member extending generally parallel to said tunnel configurations; and a plurality of spaced, parallel rigid retaining members each coupled to both of said side members and extending across the space therebetween, each of said retaining members being individually movable between an operative position wherein it extends across the space between said side members and an inoperative position wherein it lies outside of said space.